United States Patent [19]

Hirata et al.

[11] Patent Number: 4,956,052
[45] Date of Patent: Sep. 11, 1990

[54] PROCESS FOR SEPARATION USING SUPERCRITICAL FLUID

[75] Inventors: Mitsuho Hirata, Tokyo; Takeshi Ishikawa, Yokohama; Hiroshi Shiraishi, Tokyo, all of Japan

[73] Assignee: Suntory Limited, Osaka, Japan

[21] Appl. No.: 407,704

[22] Filed: Sep. 13, 1989

Related U.S. Application Data

[63] Continuation of Ser. No. 19,657, Feb. 27, 1987, abandoned.

[30] Foreign Application Priority Data

Feb. 28, 1986 [JP] Japan .................................. 61-41490

[51] Int. Cl.⁵ .......................... B01D 3/34; B01D 11/00; C07C 29/86
[52] U.S. Cl. ........................................ 203/19; 203/14; 203/49; 203/50; 203/51; 203/56; 203/57; 203/63; 203/64; 203/70; 422/256; 568/916; 568/918
[58] Field of Search .................... 203/19, 49, 14–18, 203/DIG. 13, 43, 56, 51, 64, 63, 57, 50, 70; 202/168–170, 173; 568/916, 918; 422/256, 260; 208/314, 317; 196/14.52

[56] References Cited

U.S. PATENT DOCUMENTS

| | | | |
|---|---|---|---|
| 2,631,966 | 3/1953 | Francis | 208/321 |
| 2,852,442 | 9/1958 | Moy | 208/314 |
| 3,372,203 | 3/1968 | Wimberley | 568/918 |
| 3,761,042 | 9/1973 | Atwood | 208/314 |
| 3,969,196 | 7/1976 | Zosel | 203/49 |
| 4,345,976 | 8/1982 | Peter et al. | 203/58 |
| 4,349,415 | 9/1982 | DeFilippi et al. | 203/49 |
| 4,492,808 | 1/1985 | Hagen et al. | 568/916 |
| 4,714,526 | 12/1987 | Pennisi et al. | 203/49 |
| 4,714,617 | 12/1987 | Gährs | 203/49 |
| 4,769,112 | 9/1988 | Wheldon | 203/49 |

FOREIGN PATENT DOCUMENTS

| | | |
|---|---|---|
| 2340566 | 2/1975 | Fed. Rep. of Germany. |
| 3017876 | 5/1982 | Fed. Rep. of Germany. |
| 59-141528 | 8/1984 | Japan. |
| 61-100181 | 5/1986 | Japan. |
| WO85/04816 | 11/1985 | PCT Int'l Appl. .................. 203/19 |

OTHER PUBLICATIONS

18th Annual Meeting, The Society of Chemical Engineering, Japan AS 109, 1984, and Summary.

Primary Examiner—Wilbur Bascomb
Attorney, Agent, or Firm—Burns, Doane, Swecker & Mathis

[57] ABSTRACT

A process for separation of components of a mixture of more than one organic substance or of a mixture of at least one organic substance and water by extraction using a supercritical fluid as an extractant. During the extraction an extraction aid having a higher affinity with an unextractable component of the mixture than with an extractable component of the mixture is present. Also disclosed is an apparatus for carrying out this process.

29 Claims, 2 Drawing Sheets

PROCESS FOR SEPARATION USING SUPERCRITICAL FLUID

This application is a continuation of application Ser. No. 071019,657, filed Feb. 27, 1987, now abandoned.

BACKGROUND OF THE INVENTION

1. Field of the Invention

The present invention relates to a process and apparatus for the separation of a mixture comprising more than one organic substance, or a mixture comprising one or more than one organic substance and water, using a supercritical fluid.

2. Description of the Related Art

A separation process using a supercritical fluid is used in various industries, and this technique has aroused interest from the point of view of saving energy and resources. Compared with the usual extraction process and distillation, this technique has the following advantages: improved extraction efficiency because of higher selectivity of the supercritical fluid, lower energy costs because the change of phase for separation and recovery of an extract and extractant become unnecessary, treatment of a heat-susceptible substance without degradation due to a relatively low working temperature, and easy elimination of residual solvent in product, and so on. Therefore much research is underway in a wide range of industrial fields, including the food processing and pharmaceutical industries. Typical applications of this technique are the extraction and separation of hydrocarbons, the elimination of caffeine from coffee, the extraction of a hop extract in beer production, the extraction of natural flavors, the elimination of nicotine from tobacco, and the isolation of alcohol from an aqueous alcohol solution.

As described above, although the supercritical fluid extraction process has many advantages, the separation ability thereof is limited in cases wherein components to be separated have similar boiling points, or wherein components to be separated form an azeotropic mixture. For example, Japanese Unexamined Patent Publication No. 59-141528 discloses a process for the concentration of an ethanol aqueous solution under a three-phase condition of gas / light liquid / heavy liquid. Murakami et al., in "Separation of Ethanol Aqueous Solution by Supercritical Gas" (18th Annual Meeting, The Society of Chemical Engineering, Japan AS 109, 1984), reported the use of a separation process using a supercritical fluid. Nevertheless, the supercritical fluid extraction process cannot increase the ethanol concentration to a rate higher than 90% by weight, and this concentration limit is lower than that obtained by distillation, which can increase the ethanol concentration to a rate of up to 95.6% by weight.

SUMMARY OF THE INVENTION

The present invention provides a process for the separation of components of a mixture comprising more than one organic substance, or of a mixture comprising at least one organic substance and water, by extraction using a supercritical fluid as an extractant; characterized in that, during the extraction, an extraction aid having a higher affinity with an unextractable component of the mixture than with an extractable component of the mixture is present.

The present invention also provides an apparatus for the separation of a mixture comprising an extractor to which the mixture to be separated, an extractant in a supercritical state, and an extraction aid are fed, and from which an extract fraction consisting of mainly the extractant and an extractable component of the mixture to be separated, and a residual fraction consisting of mainly the extraction aid and an unextractable component of the mixture to be separated, are discharged; an extractant-recovering device which separates the extract fraction into the extractant and a separated crude product fraction or end product consisting of mainly the extractable component; and an extraction aid-recovering device which separates the residual fraction into the extraction aid and the unextractable component; and an optional refining device to refine the separated crude product fraction to obtain a refined product.

The present invention also provides an apparatus for the separation of a mixture comprising a first extractor to which a mixture to be separated, and an extractant in a supercritical state, are fed, and from which a first extract fraction consisting of mainly the extractant and an extractable component of the mixture to be separated, and a first residual fraction consisting of substantially an unextractable component of the mixture to be separated, are discharged; a second extractor to which the first extract fraction and an extraction aid are fed, and from which a second extract fraction consisting of mainly the extractant and an extractable component of the mixture to be separated, are discharged, and a second residual fraction consisting of mainly the extraction aid and an unextractable component of the mixture to be separated, are discharged; an extractant-recovering device which separates the second extract fraction into the extractant and a separated crude product fraction or end product consisting of mainly the extractable component; and an extraction aid-recovering device which separates the second residual fraction into the extraction aid and the unextractable component; and a optional refining device which refines the separated crude product fraction to obtain a refined product.

DESCRIPTION OF THE PREFERRED EMBODIMENTS

Figure 1:
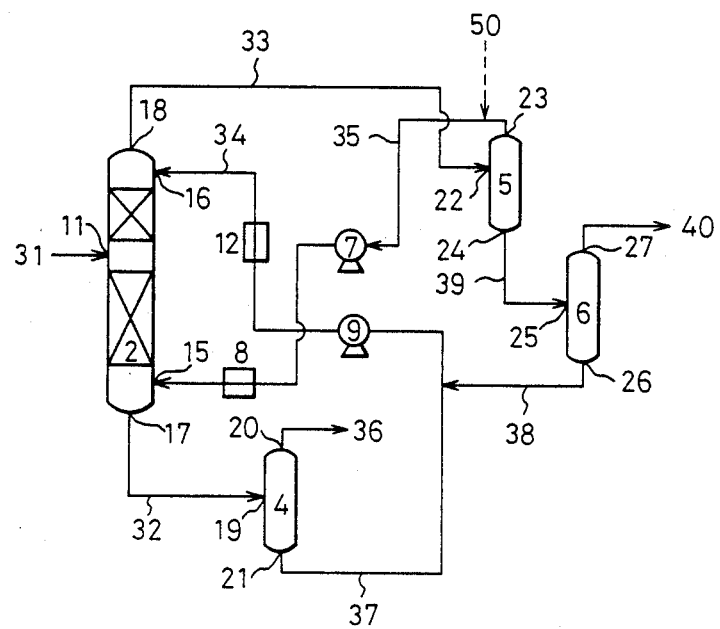
FIGS. 1 to 3 represent flow charts of embodiments of an apparatus according to the present invention.

The process of the present invention is preferably used to separate a mixture having components with similar boiling points or a mixture having components that form an azeotropic mixture. The mixtures having components with similar boiling points are, for example, methanol / water, acetic acid / water, acetone / water, benzene / cyclohexane, benzene / n-hexane, benzene / n-heptane, toluene / cyclohexane, toluene / methylcyclohexane, hexane / heptane, toluene / benzene, and the like. The mixtures whose components form an azeotropic mixture are, for example, ethanol / water, propanol / water, isopropanol / water, allyl alcohol / water, 2,3-dichloro-1-propanol / water, 2-methoxyethanol / water, 1-butanol / water, 2-butanol / water, tert-butanol / water, furfuryl alcohol / water, 1-pentanol / water, 2-pentanol / water, 4-methyl-1-butanol / water, 1,4-dioxane / water, ethyl ether / water, ethyl propyl ether / water, methyl ethyl ketone / water, tetrahydrofurane / water, ethylenediamine / water, methyl acrylate / water, methyl acetate / water, ethyl acetate / water, pyridine / water, methyl methacrylate / water, formic acid / water, benzene / cyclohexane, and the like.

Typical extractants used in a form of a supercritical fluid are, for example, inorganic substances such as carbon dioxide, ammonia and nitrous oxide, and organic substances, for example, lower paraffinic hydrocarbons such as methane, ethane, propane, butane, pentane and hexane, and lower olefinic hydrocarbons such as ethylene and propylene. Moreover, other inorganic substances such as sulfur dioxide, hydrogen halide, and other organic substance such as alcohols, dimethyl butane, benzene, trichlorofluoromethane, ethers may be used.

The above-mentioned extractant is used in an amount of 0.5 to 50, preferably 2 to 15, times by weight in relation to an amount of an extractable component or a total amount of extractable components, if more than one extractable component is present, in a mixture to be separated.

The extraction aid used in the present process is any substance which has a higher affinity with an unextractable component of the mixture to be separated than with an extractable component of the mixture, and can improve the selection ability of the extractant in a supercritical state. The selection of the extraction aid depends on the components of a mixture to be separated. In the case wherein a mixture comprising water and one or several organic substances should be separated, the extraction aid is selected from polyhydric alcohols, sugars, sugar alcohols, and the like. The extraction aids preferably include ethylene glycol, propylene glycol, diethylene glycol, butanediol, hexylene glycol, polyethylene glycol (mean molecular weight $n=200$ to 7000), polypropylene glycol (mean molecular weight $n=400$ to 7000), glycerol, and derivatives thereof, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether and the like, and carbohydrates such as glucose, fructose, galactose, xylose, mannose, sucrose, lactose, maltose, xylobiose, starches, sorbitol, mannitol and the like.

An amount of an extraction aid used depends on the composition of a mixture to be separated, kind of extractant, kind of extraction aid, and the like, and is preferably at least 40% by weight, more preferably 60 to 80% by weight, in relation to a total weight of the extraction aid and the mixture to be separated.

Next, the present invention is described in detail with reference to the drawings, wherein an ethanol aqueous solution is used as an example of a starting mixture to be separated.

FIG. 1 represents a preferable system of the present invention. In the Figure, a central region of the extractor 2 comprises a starting mixture feeding site 11 for feeding a starting ethanol / water mixture 31; a lower region thereof comprises an extractant feeding site 15 for feeding an extractant such as carbon dioxide at a supercritical state, and a residual fraction discharging site 17 for discharging a residual fraction consisting of mainly water and an extraction aid such as ethylene glycol; and at an upper region thereof comprises an extraction aid feeding site 16 for feeding an extraction aid 34, and an extract fraction discharge site 18 for discharging an extract fraction 33 consisting of mainly extracted ethanol, extractant and a small amount of an extraction aid, ethylene glycol.

A starting material ethanol aqueous solution, for example, a 10% ethanol aqueous solution 31, is fed via the starting mixture feeding site 11 into the extractor 2. An extractant carbon dioxide 35 is compressed by a compressor 7 to a pressure of, for example, 100 atm., and brought to a supercritical state by cooling to, for example, 40° C., with a heat exchanger 8, and fed via the extractant feeding site 15 into the extractor 2. On the other hand, an extraction aid 34 is fed via the extraction aid feeding site 16 into the extractor 2. As a result of the extraction in the extractor 2, the residual fraction 32, consisting of separated water derived from the starting ethanol solution and a major portion of the extraction aid, is discharged via the residual fraction discharging site 17. On the other hand, an extract fraction 33, consisting of the extractant still in a supercritical state, ethanol concentrated to a concentration higher than an azeotropic concentration, for example, 98%, and a small amount of the extraction aid ethylene glycol, is discharged via the extract fraction discharge site 18.

The extraction aid recovering device 4 is, for example, a distillation column, and has a residual fraction feeding site 19 for feeding the residual fraction 32, a water discharge site 20 for discharging water (or vapor) 36, and an extraction aid discharge site 21 for discharging an extraction aid 37. In the extraction aid recovering device 4, the residual fraction 32 consisting of a major portion of water derived from the starting ethanol aqueous solution and a major portion of the extraction aid (for example, more than 99% of fed extraction aid) is distilled and separated into water 36 and the extraction aid 37. The extraction aid 37 is then combined with a small amount of an extraction aid 38 recovered by the refining device, described hereinafter in detail, and the combined extraction aid 34 is recycled via a pump 9 into the extractor 2. The extraction aid may be either in a supercritical state or a subcritical state. If the extraction aid is in a subcritical state, the extraction aid is preferably adjusted to a temperature higher than a temperature 0.9 times a critical temperature, and to a pressure higher than a pressure 0.5 times a critical pressure, by a heat exchanger 12 and the pump 9.

The extractant recovering device 5 may be a conventional device used for the separation of extracted ethanol from an extractant by destroying or shifting a supercritical condition, and comprises an extract fraction feeding site 22 for feeding the extract fraction 33, an extractant discharge site 23 for discharging a recovered extractant 35, and a separated crude fraction discharging site 24 for discharging separated crude ethanol 39. For example, by decreasing a pressure or increasing a temperature of the extract fraction 33, which has been in a supercritical state, the extract fraction 33 is separated into an extractant 35 and a crude ethanol product 39 which is sufficiently concentrated and, occasionally, contains a small amount of an extraction aid. A decreasing pressure is preferable for the separation. The recovered extractant 35 is adjusted to a predetermined supercritical state by the compressor 7 and the heat exchanger 8, and then recycled into the extractor 2. Note, if necessary, any loss of the extractant during the recycling is supplemented by a fresh extractant 50.

The refining device 6 is, for example, a distillation column, and comprises a separated crude product feeding site 25, an extractant discharge site 26, and an end product discharge site 27. In the refining device, the crude product 39 consisting of a small amount of the extraction aid and highly concentrated ethanol, for example, an ethanol product having a concentration of more than 98% in relation to a total of water and ethanol, which concentration is higher than an azeotropic concentration of a mixture consisting of ethanol and water, is separated into an ethanol product 40 having a concentration of more than 98% and a small amount of the extraction aid 38. The extraction aid 38 is combined with the extraction aid 37 recovered from the extraction aid recovering device 4, and the combined extraction aid 34 is recycled into the extractor 2, as described above.

Note, in the above-mentioned embodiment, a minor portion of the ethylene glycol is removed by an extract; when an extraction aid which is not removed by an extract, for example, starch, glucose, sucrose or the like, is used, since the extraction aid is not incorporated into the extract fraction 33, and therefore, into the crude product 39, the refining device 6 may not be necessary.

Moreover, in the above-mentioned embodiment, for the extraction aid recovering device 4 and the refining device 6 distillation columns are used, these devices are not limited to a distillation column; and any means having the above-mentioned separation function, for example, reverse osmosis, pervaporation, and like, can be used.

Figure 2:
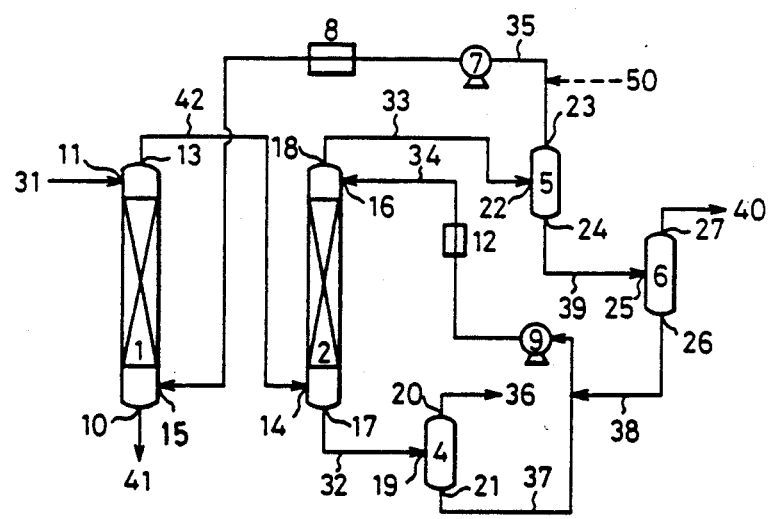

The second embodiment of the present process is shown in FIG. 2. In this figure, the same numbers as those in FIG. 1 are used for parts corresponding to those in FIG. 1. This embodiment is the same as the above-mentioned first embodiment except that a starting mixture, for example, a 10% ethanol aqueous solution, is subjected to extraction and separation without an extraction aid in the first extractor 1, and subsequently, extraction using an extraction aid is carried out in the second extractor 2.

The first extractor 1 has an upper region comprising a starting mixture feeding site 11 and a first extract fraction discharging site 13, and a lower region comprising an extractant feeding site 15. In this embodiment, for example, a 10% ethanol aqueous solution 31, is fed via the starting mixture feeding site 11 into the first extractor 1, wherein the ethanol aqueous solution is separated into a first residual fraction 41, and a first extract fraction 42 consisting of an extractant carbon dioxide and a concentrated ethanol product having a concentration of about 90% in relation to a total amount of water and ethanol.

The second extractor 2 has a lower region comprising a first extract fraction feeding site 14. In the second extractor 2, the first extract fraction 42 is separated into a second residual fraction 32 and a second extract fraction 33. In the second embodiment, the extraction aid recovering device 4, the extractant recovering device 5, and the refining device 6 function in the same manner as described for the first embodiment. In this embodiment, since a major portion of the water in the starting mixture has been eliminated in the first extractor, an amount of water in the first extract fraction 42 and, therefore, in the second residual fraction, is very small. Therefore, an amount of water eliminated in the extraction aid recovering device 4 is very small, resulting in a decreased amount of extraction aid used, and therefore, in a remarkable saving in construction and operation costs for the extraction aid recovering device 4.

Figure 3:
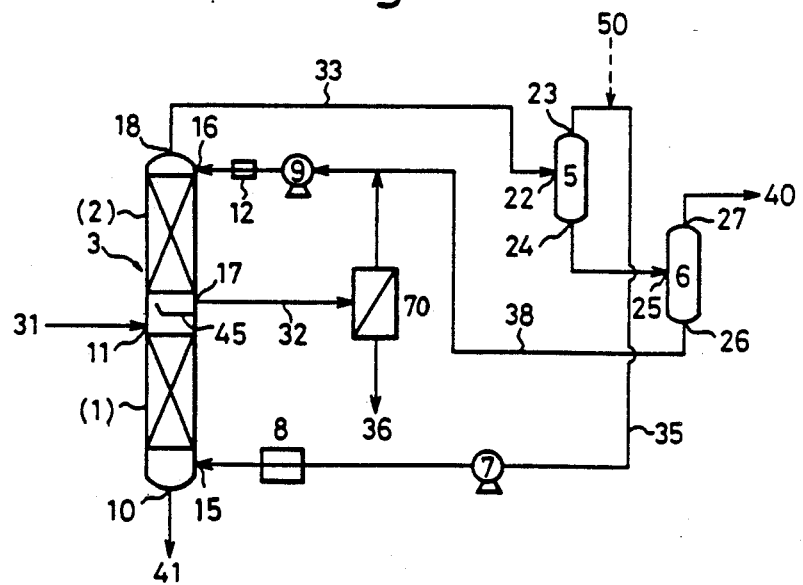

FIG. 3 represents the third embodiment of the apparatus according to the present invention. In this embodiment, the first extractor 1 and the second extractor 2 in FIG. 2 are integrated as the extractor 3, as shown in FIG. 3. the lower half (1) of the extractor 3 corresponds to the first extractor 1 in FIG. 2, and the upper half (2) of the extractor 3 corresponds to the second extractor 2 in FIG. 2. The extractor 3 has an upper region comprising an extract fraction discharge site 18 and an extraction aid feeding site 16, a central region comprising a starting mixture feeding site 11 and a second residual fraction discharge site 17, and a lower region comprising a first residual fraction discharge site 10 and an extractant feeding site 15. A starting mixture, for example, a 10% ethanol aqueous solution 31, is fed via the starting mixture feeding site 11 to the extractor 3, and an extractant, for example, carbon dioxide in a supercritical state, is fed via the extractant feeding site 15 into the extractor 3; and a first residual fraction 41 consisting of water derived from the starting mixture, and an extractant still in a supercritical state and concentrated ethanol having a concentration of about 90% in relation to a total amount of water and ethanol, move from the lower part (1) of the extractor 3 to the upper part (2) of the extractor 3. An extraction aid, which has been fed via the extraction aid feeding site 16 into the extractor 3, is recovered in a receiver 45, except that a minor portion of the extraction aid is transferred to a extract fraction 33. The extraction aid recovered in the receiver 45 is removed, via a second residual fraction site 17, as a second residual fraction 32. The extractant recovering device 5 and the refining device 6 function in the same manner as described for the first embodiment. In this embodiment, since the apparatus can be compactly constructed, the construction and operation costs are further reduced.

In the third embodiment, the second residual fraction 32 consisting of a large amount of extraction aid and a small amount of water is separated by a reverse osmosis or pervaporation device 70 instead of a distillation column 4.

Although a continuous separation process is used in the above-mentioned embodiments, a batch-wise process also can be used. In the batch-wise process, first a starting mixture and an extraction aid are fed into an extractor at a predetermined ratio, and then an extractant in a supercritical state is introduced into the extractor to obtain an extract fraction.

Although in the above-mentioned embodiment the process and apparatus of the present invention are illustrated in detail for a mixture of water and ethanol, similarly, a mixture of water and another lower alcohol such as methanol, propanol, butanol or the like, or a mixture of water and a lower alkanoic acid such as acetic acid, propionic acid or the like, can be separated to produce a concentrated lower alcohol or lower alkanoic acid. Also similarly, a mixture of organic compounds can be separated.

According to the present process and apparatus, an organic mixture whose components have a similar boiling point, and therefore, are difficult to be separated by usual distillation, can be effectively separated. Moreover, a mixture of water and an organic substance which can form an azeotropic mixture with water, can be efficiently separated to produce a highly concentrated organic product over an azeotropic concentration.

EXAMPLES

The present invention will now be further illustrated by, but is by no means limited to, the following examples.

EXAMPLE 1

About 2000 g of total weight of a mixture consisting of ethanol, water and ethylene glycol, having a ratio that differs run by run, was charged in a 3 liter - extractor, and carbon dioxide in a supercritical state was then introduced to the extractor to separate ethanol. More specifically, ethylene glycol, as an extraction aid, was charged into the extractor in an amount of 20, 50, or 80% by weight in relation to a total weight of the ethylene glycol and an ethanol aqueous solution. A balance amount of the ethanol aqueous solution having an ethanol concentration of about 20, 30, 60, 70, 80, or 90% by weight in relation to a total weight of ethanol and water, was also charged into the extractor. A batch-wise extraction was then carried out by a flow-through method, wherein carbon dioxide in a supercritical state was passed through the extractor at a pressure of 103.5 kg/cm$^2$ (gauge pressure) and a temperature of 40° C., and at a flow rate of 1.5 to 3 kg/hour. A pressure of the fluid which has passed through the extractor, which was still in a supercritical state, was reduced to 30 kg/cm$^2$ (gauge pressure) to separate carbon dioxide from other components which substantially consist of ethanol and water and is designated as "extract" in the Examples. An ethanol concentration of the extract was determined by gas chromatography. The results are shown in Table 1.

In this table, the phrase "ethanol concentration of original liquid" denotes the percentage by weight of ethanol in relation to a total weight of ethanol, ethylene glycol and water before the supercritical carbon dioxide is passed through the extractor, and "Solubility of ethanol+water" denotes a total amount of ethanol and water dissolved in 100 g of carbon dioxide in the fluid which has passed the extractor. The term "Selectivity" denotes a value obtained by dividing a percentage by weight of ethanol in relation to a weight of water in the extract by a percentage by weight of ethanol in relation to a weight of water in the original ethanol aqueous solution.

TABLE 1

| Ethanol Concentration of Original Liquid % by Weight | Ethanol Concentration of Extract % by Weight | Solubility of Ethanol + Water g/100 g CO$_2$ | Selectivity |
|---|---|---|---|
| Extraction Aid Ethylene Glycol 10% by Weight | | | |
| 13.67 | 83.26 | 0.924 | 31.41 |
| 15.02 | 84.64 | 1.081 | 31.18 |
| 16.27 | 86.06 | 0.998 | 31.77 |
| 62.60 | 91.44 | 5.113 | 6.38 |
| 64.99 | 91.64 | 5.645 | 5.91 |
| 67.19 | 91.29 | 5.977 | 5.12 |
| Extraction Aid Ethylene Glycol 50% by Weight | | | |
| 18.31 | 86.45 | 0.667 | 28.47 |
| 20.87 | 88.11 | 0.894 | 28.10 |
| 23.61 | 89.28 | 1.073 | 26.95 |
| 50.47 | 90.13 | 1.400 | 8.96 |
| 53.78 | 92.48 | 1.950 | 10.57 |
| 60.11 | 92.34 | 2.521 | 8.30 |
| 64.48 | 94.53 | 2.122 | 9.52 |
| 67.22 | 94.98 | 2.392 | 9.23 |
| 68.15 | 95.13 | 2.681 | 9.13 |
| Extraction Aid Ethylene Glycol 80% by Weight | | | |
| 24.31 | 88.06 | 0.22 | 22.96 |
| 25.80 | 86.21 | 0.30 | 17.98 |
| 27.31 | 89.23 | 0.31 | 22.06 |
| 66.42 | 97.02 | 0.75 | 16.46 |
| 69.27 | 97.01 | 0.86 | 14.37 |
| 71.96 | 97.35 | 1.05 | 14.32 |
| 73.37 | 97.35 | 1.05 | 13.34 |
| 79.39 | 96.88 | 0.85 | 8.06 |
| 80.89 | 96.65 | 1.16 | 6.81 |
| 86.69 | 98.36 | 0.63 | 9.21 |

Next, for comparison, the same experiment as described above was repeated except that the extraction aid ethylene glycol was not added. The results are shown in Table 2.

TABLE 2

| Ethanol Concentration of Original Liquid % by Weight | Ethanol Concentration of Extract % by Weight | Solubility of Ethanol + Water g/100 g CO$_2$ | Selectivity |
|---|---|---|---|
| 7.76 | 71.79 | 0.47 | 30.25 |
| 8.14 | 73.29 | 0.50 | 30.97 |
| 8.52 | 75.12 | 0.56 | 32.42 |
| 8.96 | 77.27 | 0.60 | 34.59 |
| 9.48 | 78.36 | 0.74 | 34.58 |
| 15.61 | 82.70 | 0.95 | 25.82 |
| 16.43 | 83.70 | 1.04 | 26.10 |
| 17.30 | 84.43 | 1.16 | 25.90 |
| 18.26 | 85.82 | 1.33 | 27.07 |
| 19.38 | 88.06 | 1.51 | 30.71 |
| 23.03 | 87.38 | 1.51 | 23.17 |
| 24.35 | 87.85 | 1.92 | 22.45 |
| 25.74 | 88.14 | 1.82 | 21.45 |
| 27.29 | 89.88 | 2.37 | 23.66 |
| 29.05 | 89.84 | 2.59 | 21.61 |
| 54.16 | 90.94 | 4.86 | 8.50 |
| 58.29 | 91.05 | 5.30 | 7.28 |
| 61.03 | 91.09 | 6.16 | 6.53 |
| 62.71 | 90.89 | 6.45 | 5.93 |
| 64.25 | 90.97 | 6.87 | 5.61 |
| 65.66 | 91.15 | 6.88 | 5.38 |
| 67.00 | 90.90 | 7.50 | 4.92 |
| 68.24 | 90.67 | 7.46 | 4.52 |
| 69.36 | 90.19 | 7.87 | 4.06 |
| 72.16 | 91.09 | 8.22 | 3.94 |
| 74.81 | 91.09 | 9.47 | 3.44 |
| 76.51 | 91.04 | 10.39 | 3.42 |
| 77.95 | 90.73 | 11.34 | 2.77 |

As can be seen from a comparison of Table 1 and 2, when the extraction aid ethylene glycol was not used, the maximum ethanol concentration was about 90%. On the other hand, when ethylene glycol was added by an amount of 50% by weight, an ethanol concentration much higher than the azeotropic concentration was obtained.

EXAMPLE 2

Example 1 was repeated except that diethylene glycol was used as an extraction aid. The results are shown in Table 3.

TABLE 3

| Ethanol Concentration of Original Liquid % by Weight | Ethanol Concentration of Extract % by Weight | Solubility of Ethanol + Water g/100 g CO$_2$ | Selectivity |
|---|---|---|---|
| Extraction Aid Diethylene Glycol 10% by Weight | | | |
| 60.17 | 91.44 | 5.06 | 7.07 |
| 63.12 | 91.64 | 5.64 | 6.40 |

TABLE 3-continued

| Ethanol Concentration of Original Liquid % by Weight | Ethanol Concentration of Extract % by Weight | Solubility of Ethanol + Water g/100 g CO$_2$ | Selectivity |
|---|---|---|---|
| 65.64 | 91.29 | 5.98 | 5.49 |
| 67.90 | 84.79 | 7.19 | 2.64 |
| Extraction Aid Diethylene Glycol 30% by Weight | | | |
| 34.79 | 90.13 | 1.40 | 17.12 |
| 45.02 | 92.48 | 1.95 | 15.02 |
| 57.00 | 92.34 | 2.52 | 9.09 |
| 65.82 | 91.37 | 1.99 | 5.50 |

EXAMPLE 3

Example 1 was repeated except that polyethylene glycol (mean molecular weight 200) was used as an extraction aid. The results are shown in Table 4.

TABLE 4

| Ethanol Concentration of Original Liquid % by Weight | Ethanol Concentration of Extract % by Weight | Solubility of Ethanol + Water g/100 g CO$_2$ | Selectivity |
|---|---|---|---|
| Extraction Aid Polyethylene Glycol 10% by Weight | | | |
| 79.00 | 93.16 | 7.49 | 3.62 |
| 86.93 | 91.16 | 25.86 | 1.55 |
| 89.82 | 89.51 | 36.90 | 0.97 |
| Extraction Aid Polyethylene Glycol 50% by Weight | | | |
| 81.37 | 96.53 | 3.60 | 6.37 |
| 84.52 | 96.58 | 3.50 | 5.17 |
| 86.55 | 96.92 | 4.54 | 4.89 |
| 88.64 | 96.91 | 5.24 | 4.02 |
| Extraction Aid Polyethylene Glycol 80% by Weight | | | |
| 81.11 | 97.29 | 0.96 | 8.35 |
| 83.96 | 97.67 | 1.34 | 8.02 |
| 86.64 | 97.69 | 3.05 | 6.51 |
| 88.66 | 97.45 | 0.49 | 4.89 |

EXAMPLE 4

Example 1 was repeated except that glucose was used as an extraction aid. The results are shown in Table 5.

TABLE 5

| Ethanol Concentration of Original Liquid % by Weight | Ethanol Concentration of Extract % by Weight | Solubility of Ethanol + Water g/100 g CO$_2$ | Selectivity |
|---|---|---|---|
| Extraction Aid Glucose 10% by Weight | | | |
| 46.25 | 92.20 | 3.81 | 13.74 |
| 67.88 | 90.29 | 26.74 | 4.40 |
| 83.09 | 87.78 | 46.56 | 1.46 |
| Extraction Aid Glucose: Water = 1:1 | | | |
| 84.48 | 94.59 | 5.47 | 3.21 |
| 88.51 | 94.80 | 9.99 | 2.37 |
| 90.58 | 94.74 | 16.54 | 1.87 |
| 92.02 | 94.75 | 53.99 | 1.56 |
| 93.63 | 94.71 | 47.37 | 1.22 |

EXAMPLE 5

Example 1 was repeated except that glycerol was used as an extraction aid. The results are shown in Table 6.

TABLE 6

| Ethanol Concentration of Original Liquid % by Weight | Ethanol Concentration of Extract % by Weight | Solubility of Ethanol + Water g/100 g CO$_2$ | Selectivity |
|---|---|---|---|
| Extraction Aid Glycerol 10% by Weight | | | |
| 55.06 | 92.47 | 5.23 | 10.03 |
| 58.35 | 92.25 | 6.12 | 8.49 |
| 64.15 | 92.07 | 5.89 | 6.49 |
| 66.91 | 92.95 | 6.02 | 6.52 |
| Extraction Aid Glycerol 50% by Weight | | | |
| 86.77 | 98.42 | 5.63 | 9.52 |
| 87.20 | 98.67 | 6.91 | 10.89 |
| 90.34 | 98.66 | 9.08 | 7.85 |

EXAMPLE 6

A 10% by weight ethanol aqueous solution was continuously extracted by an apparatus as shown in FIG. 2. That is, the solution was continuously fed to a top of the first extraction column (packed column; packing diameter 3 to 4 mm, Dixon Packing; column diameter 2.5 cm, packed height 2 m); on the other hand, a carbon dioxide extractant in a supercritical state at a temperature of 40° C. and a pressure of 103.4 kg/cm$^2$ (gauge pressure) was introduced to a bottom of the extraction column at a flow rate of 5200 g/hour. From the top of the extraction column, a first extract fraction containing 81% by weight of ethanol was obtained at a flow rate of 68.5 g/hour.

The first extract fraction was continuously sent to a bottom of the second extraction column (packed column; packing diameter 3~4 mm, Dixon Packing; column diameter 2.5 cm, packed height 1 m), and to a top of the second extraction column, ethylene glycol as an extraction aid was fed at a flow rate of 300 g/hour. From the top of the second extraction column, 98% by weight of ethanol product was obtained at a rate of 55 g/hour. In the second extraction column, the operation temperature was 40° C., and the operation pressure was 103.4 kg/cm$^2$ (gauge pressure).

EXAMPLE 7

A ten percent by weight ethanol aqueous solution was continuously extracted using an apparatus as shown in FIG. 2. That is, the solution was fed to a central site of the first extraction column (packed column; packing diameter 3 to 4 mm Dixon Packing; column diameter 2.5 cm, packed height 4 m); on the other hand a carbon dioxide extractant in a supercritical state at a temperature of 60° C. and a pressure of 200 kg/cm$^2$ (gauge pressure) was fed at a flow rate of 4800 g/hour to the bottom of the column. From the top of the extraction column, a first extract fraction containing 47.1% by weight of ethanol was obtained with an ethanol recovery rate of about 99% in relation to an amount of original ethanol, at a flow rate of 63.1 g/hour. Next, the first extractant fraction was sent to a bottom of the second extraction column (packed column; packing diameter 3~4 mm, Dexon Packing; column diameter 2.5 cm, packed height 2 m) which was controlled to maintain a temperature of 40° C. and a pressure of 100 kg/cm$^2$ (gauge pressure); and a glycerol extraction aid was fed to the top of the second extraction column at a flow rate of 100 g/hour. From the top of the column, an absolute ethanol product having a concentration of 99.9% by weight of ethanol was obtained at a rate of 28 g/hour.

In this case, a portion of the ethanol product was recycled to the top of the second extraction column as reflux.

EXAMPLE 8

An acetic acid aqueous solution consisting of 81.8 g of acetic acid and 690 g of water was charged into a 3 l-volume extractor, and 1530 g of ethylene glycol as an extraction aid was added to the extractor. Carbon dioxide in a supercritical state at a temperature of 40° C. and a pressure of 100 kg/cm$^2$ (gauge pressure) was fed to the extractor at a rate of 1 kg/hour for two hours while maintaining a temperature of 40° C. and a pressure of 100 kg/cm$^2$ (gauge pressure) in the extractor, to carry out supercritical extraction. By shifting a supercritical condition of a fluid which has passed through the extractor, by reducing the pressure, carbon dioxide was separated from other components which constitute an extract fraction. As a result, the extract fraction was 24.1 g of an acetic acid aqueous solution having an acetic acid concentration of 86% by weight.

We claim:

1. A process for separating a mixture of an organic compound and water, comprising the steps of:
   providing a supercritical fluid extractant which extracts the organic compound from the mixture, and an extraction aid having a stronger affinity for the water than for said organic compound;
   feeding said mixture, said extractant and said extraction aid into an extractor so as to bring said mixture into contact with said extractant and said extraction aid;
   extracting said organic compound with said extractant to separate said organic compound from said water mixed with said extraction aid; and
   separating said organic compound from said extractant.

2. A process for separating a mixture of an organic compound and water, in which the difference in boiling points between said organic compound and said water is relatively small, comprising the steps of:
   providing a supercritical fluid extractant which extracts the organic compound from the mixture, and an extraction aid having a stronger affinity for the water than for said organic compound;
   feeding said mixture, said extractant and said extraction aid into an extractor so as to bring said mixture into contact with said extractant and said extraction aid;
   extracting said organic compound with said extractant to separate said organic compound from said water mixed with said extraction aid; and
   separating said organic compound from said extractant.

3. A process according to claim 1, wherein said organic compound forms an azeotropic mixture with said water.

4. A process according to claim 1, wherein the extractant is an inorganic compound comprising carbon dioxide, ammonia or nitrous oxide.

5. A process according to claim 1, wherein the extractant is a lower hydrocarbon comprising a lower paraffinic hydrocarbon or a lower olefinic hydrocarbon.

6. A process according to claim 1, wherein said extraction aid has a high boiling point and a strong affinity for water.

7. A process according to claim 6, wherein the extraction aid is a polyhydric alcohol comprising polyethylene glycol, polypropylene glycol or glycerol.

8. A process according to claim 6, wherein the extraction aid is an alcohol derived from sugar.

9. A process according to claim 1, wherein the amount of said extraction aid is not less than 40% of the total weight of the extraction aid and the mixture.

10. A process according to claim 9, wherein the amount of said extraction aid is 60 to 80% of the total weight of the extraction aid and the mixture.

11. A process according to claim 9, wherein the extraction aid is in a subcritical state.

12. A process according to claim 11, wherein the temperature of said extraction aid is at least 0.9 times the critical temperature of the extractant before the extraction aid is fed into said extractor.

13. A process according to claim 11, wherein the pressure of said extraction aid is at least 0.5 times the critical pressure of the extractant before the extraction aid is fed into said extractor.

14. A process for continuously separating a mixture of an organic compound and water, comprising the steps of:
   providing a supercritical fluid extractant which extracts said organic compound, and an extraction aid having a stronger affinity for the water than for said organic compound;
   feeding said mixture, said extractant and said extraction aid into an extractor so as to bring said mixture into contact with said extractant and said extraction aid;
   extracting said organic compound with said extractant to separate said organic compound from said water mixed with said extraction aid;
   separating said extraction aid from said water; and
   separating said organic compound from said extractant.

15. A process for separating a mixture of ethanol and water, comprising the steps of:
   providing a supercritical fluid of carbon dioxide which serves as an extractant to extract the ethanol, and an extraction aid having a strong affinity for water;
   feeding the mixture, said extractant and said extraction aid into an extractor so as to bring said mixture into contact with said extractant and said extraction aid, said extraction aid being not less than 40% by weight of the total weight of the extraction aid and the mixture;
   extracting said ethanol with said extractant to separate said ethanol from said water mixed with said extraction aid; separating said extraction aid from said water; and separating said ethanol from said extractant; thereby producing substantially pure ethanol.

16. A process according to claim 9, wherein the extraction aid is in a supercritical state.

17. A process for separating a mixture of ethanol and water, comprising the steps of:
   preparing a supercritical fluid of carbon dioxide which serves as an extractant to extract the ethanol, and an extraction aid having a strong affinity for water;
   feeding the mixture, said extractant and said extraction aid into an extractor, thereby bringing said mixture into contact with said extractant and said extraction aid, said extraction aid being not less than 40% of the total weight of the extraction aid and the mixture;

extracting said ethanol with said extractant to separate said ethanol from said water mixed with said extraction aid; and producing an ethanol aqueous solution which has an ethanol concentration higher than that of an azeotropic mixture of water and ethanol.

18. A process for separating a mixture of first and second organic compounds, comprising the steps of:
providing a supercritical fluid extractant for extracting the first organic compound, and an extraction aid having a stronger affinity for the second organic compound than for said first organic compound;
feeding the mixture, said extractant and said extraction aid into an extractor so as to bring said mixture into contact with said extractant and said extraction aid;
extracting said first organic compound with said extractant to separate said first organic compound from said second organic compound mixed with said extraction aid; and
separating said first organic compound from said extractant.

19. A process according to claim 18, wherein the difference between the boiling point of said first organic compound and that of said second organic compound is relatively small.

20. A process according to claim 18, wherein the extractant is an inorganic compound comprising carbon dioxide, ammonia or nitrous oxide.

21. A process according to claim 18, wherein said extractant is a lower hydrocarbon comprising a lower paraffinic hydrocarbon or a lower olefinic hydrocarbon.

22. A process according to claim 18, wherein the amount of said extraction aid is not less than 40% of the total weight of the extraction aid and the mixture.

23. A process according to claim 22, wherein the amount of said extraction aid is 60 to 80% of the total weight of the extraction aid and the mixture.

24. A process according to claim 22, wherein said extraction aid is in a supercritical state.

25. A process according to claim 22, wherein said extraction aid is in a subcritical state.

26. A process according to claim 25, wherein the temperature of said extraction aid is 0.9 times the critical temperature of the extractant before the extraction aid is fed into said extractor.

27. A process according to claim 25, wherein the pressure of said extraction aid is 0.5 times the critical pressure of the extractant before the extractant aid is fed into said extractor.

28. A process for continuously separating a first organic compound from a mixture of first and second organic compounds, comprising the steps of;
preparing a supercritical fluid serving as an extractant for extracting the first organic compound, and an extraction aid having a stronger affinity for the second organic compound than for said first organic compound;
feeding said mixture, said extractant and said extraction aid into an extractor so as to bring said mixture into contact with said extractant and said extraction aid;
extracting said first organic compound with said extractant to separate said first organic compound from said second organic compound mixed with said extraction aid;
separating said extraction aid from said second organic compound; and
separating said first organic compound from said extractant.

29. A process for separating a mixture of an organic compound and water, comprising:
providing a supercritical fluid extractant which extracts the organic compound from the mixture, and an extraction aid having a stronger affinity for the water than for said organic compound, said extraction aid being a carbohydrate selected from the group consisting of glucose, sucrose and starch;
feeding said mixture, said extractant and said extraction aid into an extractor so as to bring said mixture into contact with said extractant and said extraction aid;
extracting said organic compound with said extractant to separate said organic compound from said water mixed with said extraction aid; and
separating said organic compound from said extractant.

* * * * *